July 23, 1940.  J. DEL R. DE LAND  2,208,881
ORCHARD PROTECTIVE SYSTEM
Filed Feb. 5, 1937  2 Sheets-Sheet 1
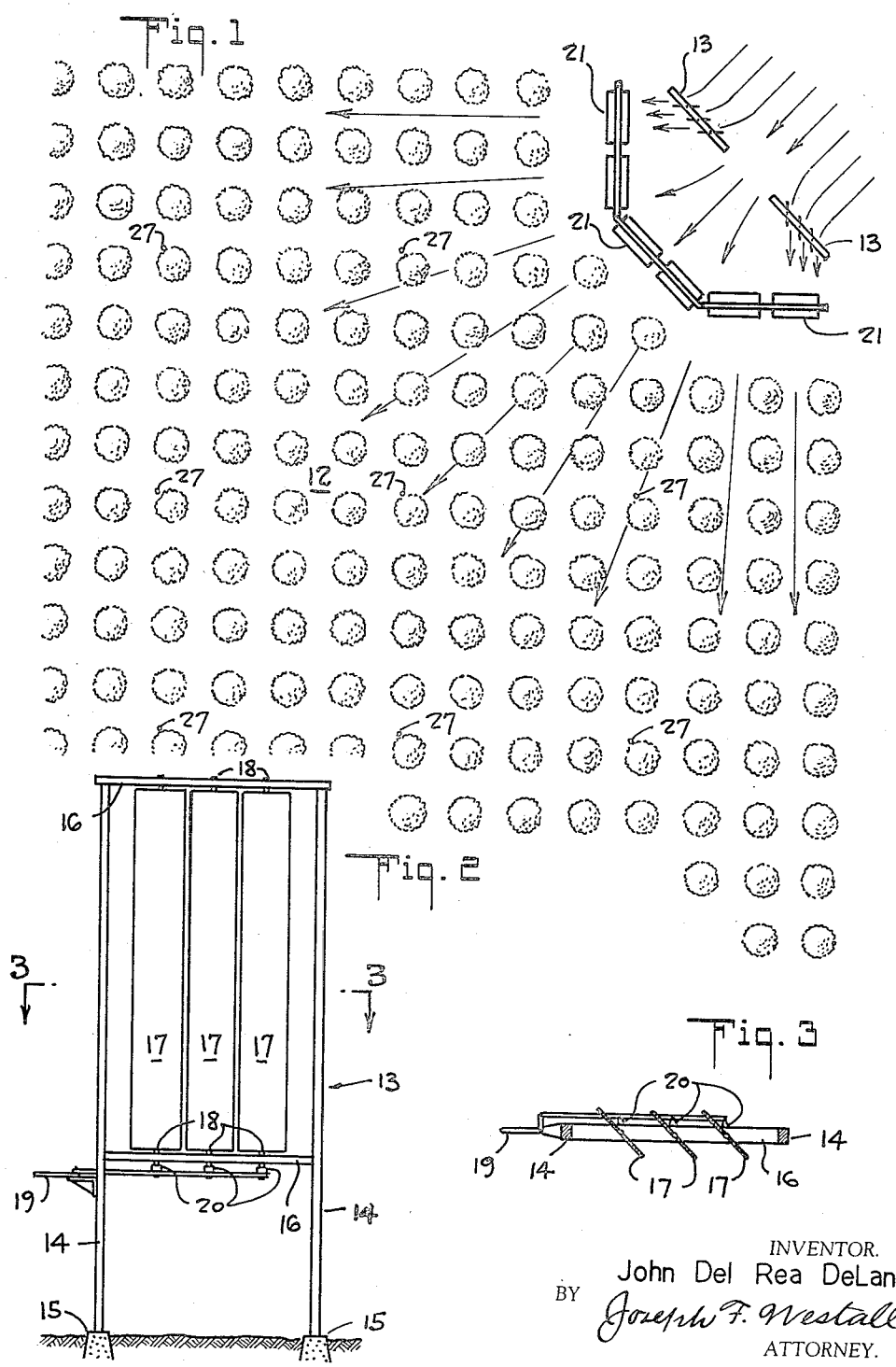
INVENTOR.
John Del Rea DeLand
BY Joseph F. Westall
ATTORNEY.

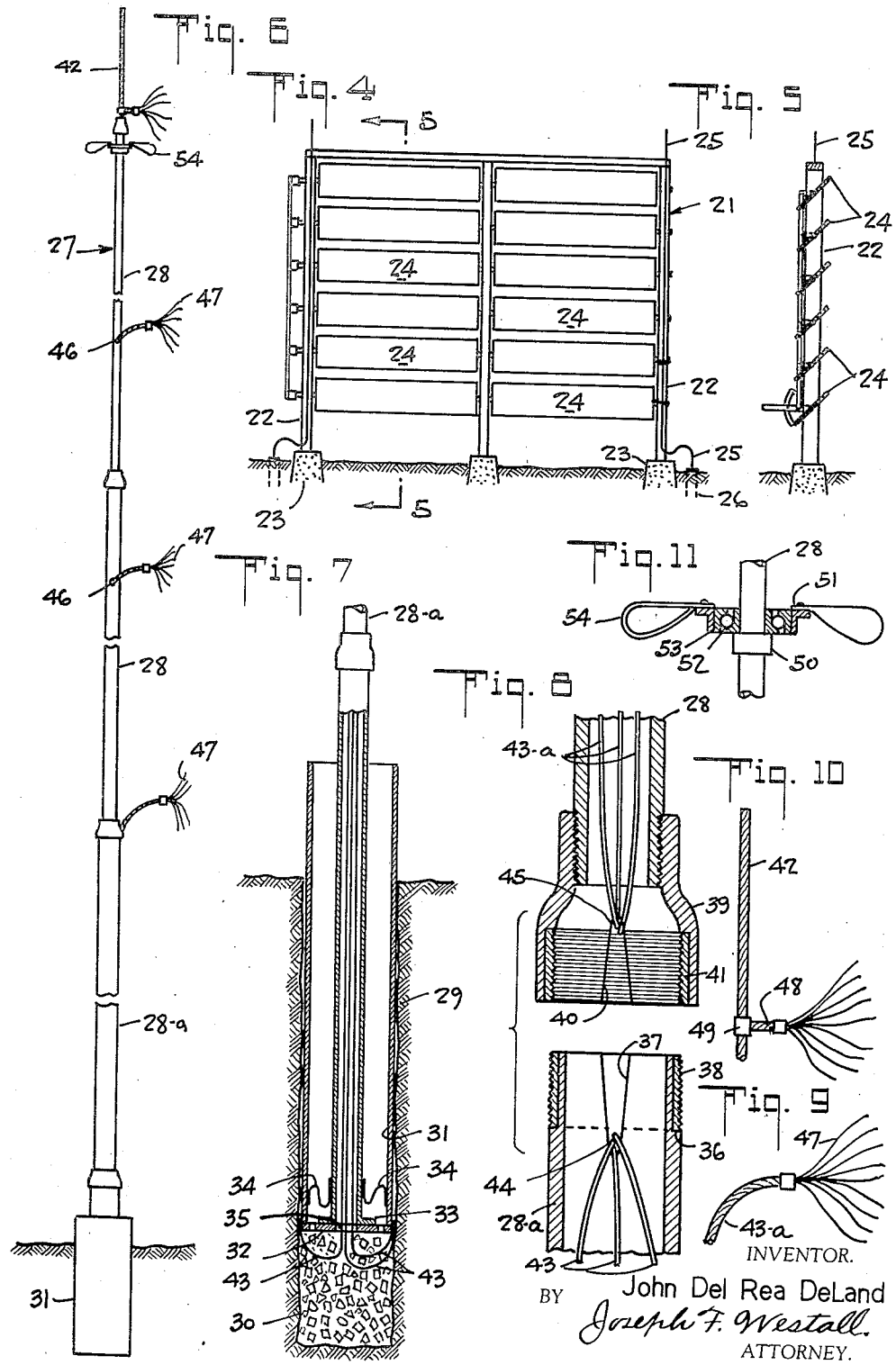

Patented July 23, 1940

2,208,881

UNITED STATES PATENT OFFICE 2,208,881

ORCHARD PROTECTIVE SYSTEM

John Del Rea De Land, Anaheim, Calif.

Application February 5, 1937, Serial No. 124,216

6 Claims. (Cl. 47—1)

This invention relates to means and methods of protecting trees from winds and electric charges, and particularly contemplates improvements in the orchard protective systems disclosed in Letters Patent No. 1,749,068, No. 1,902,119, and No. 2,039,522, granted to me on March 4, 1930, March 21, 1933, and May 5, 1936, respectively.

The passage of hot winds, of the type well known to California citrus growers, through a groove of fruit trees in the absence of any windbreak often leaves the fruit and foliage partially withered and burned. The effect of the temperature of the air and of its velocity, believed to be contributing factors to this condition, have been largely overcome by the deflection of the wind over the trees by adjustable louvers located at the windward side of the grove. The wind deflector most favorably adapted for this purpose is described and claimed in my aforementioned patent, No. 2,039,522. This forced deviation of the wind also serves to minimize the burning of the trees by electric charges generated on the trees by the friction of the wind and sand.

However, it has been found that regardless of the effectiveness of the louvers in diverting the wind, the trees are occasionally burned by static electric charges in the air created independently of the trees. For this reason, the most efficient protective measures must necessarily include both wind deflecting and electricity-grounding apparatus, which it is a principal object of the present invention to provide.

While it has heretofore been impossible to artificially ground these electric charges, it has been found that the friction of the wind above the trees with the louvers, as well as the friction resulting from the cross flow of air currents resulting from the upward deflection of wind by the louvers into the wind overhead causes the electric charges to assume a condition susceptible to grounding by apparatus as herein provided.

Another object is to provide, in combination, an apparatus for the protection of groves from winds and electricity by the deflection of the winds, to obviate the generation of electricity in the grove by friction of the wind on the trees, and a series of conductor poles to ground the electricity in the air between and above the trees.

Another object of primary importance is the provision of a louver wall for the deflection of wind currents laterally, either away from the grove, or to direct the wind in a specific direction toward the grove for subsequent upward deflection by longitudinally horizontal louvers, whereby the strain on the horizontal louvers is reduced to a minimum and the electric charge is diffused in the wind for more effective grounding by a plurality of conductor poles.

Another object is to provide apparatus for converting static agencies into a form of electricity adaptable for grounding, and, in combination therewith, means for grounding the converted electric charges.

Another object is to provide a sectional conductor pole of maximum sensitivity resiliently supported in a substantially vertical position and adapted for facile disassembly when required, as when preparing the grove for a conventional fumigating process.

Another object is to provide movable means to augment the electricity-attractive qualities of a grounding rod adapted for actuation by the wind.

Other objects and salient features of my invention will be apparent to those of skill in this art upon an examination of the following description read in the light of the accompanying drawings, in which—

Fig. 1 is a plan view of an orchard with the apparatus of my invention operatively arranged therein;

Fig. 2 is an elevation of a vertical louver wall employed to distribute or deflect the wind laterally;

Fig. 3 is a section taken on line 3—3 of Fig. 2;

Fig. 4 is an elevation of the louver wall adapted to direct the wind in a course over the trees;

Fig. 5 is a sectional view taken on line 5—5 of Fig. 4;

Fig. 6 is an elevation of one of the electricity-grounding poles of my invention;

Fig. 7 is a sectional view of the lower end of the conductor pole illustrating preferred apparatus for its mounting in the ground;

Fig. 8 is a composite sectional view of a joint in the conductor pole;

Fig. 9 is an elevation of one of the frayed wires extending laterally from and attached to the grounding pole;

Fig. 10 is an elevation of the lateral support for a frayed wire at the upper end of a conductor pole;

Fig. 11 is an enlarged elevation of the rotor element illustrated in Fig. 6 to facilitate grounding of the electricity.

Referring to the drawings in detail, the numerals of which indicate similar parts throughout the several views, 12 designates generally an orchard diagonally disposed with respect to the direction of the usual flow of wind, having my invention arranged therein. At the windward corner of the orchard, two vertical-louver walls 13, hereinafter described in detail, are mounted at right angles to the direction of the flow of wind and extend inwardly from respective diverging sides of the corner of the grove in which they are disposed. Each louver wall 13 (Fig. 2) consists of a pair of uprights 14 mounted preferably in cement foundations 15 in the ground. A pair of cross bars 16 extend between and are secured to the uprights 14 by any means well known in the art. Between cross bars 16 a plurality of vertical, parallel louvers 17 are journalled by pins 18. The angular adjustment of the louvers 17 is regulated by a handle 19 connected to the louver pins 18 by intermediate arms 20, or in any manner well known in the art. Thus by manipulation of the handle 19, the louvers 17 may be turned to divert the wind passing therebetween into the orchard in directions parallel to the respective sides of the orchard forming the windward corner thereof. As indicated by the arrows in Fig. 1 the wind passing between the louver walls 13 spreads fan-like in response to the partial vacuum created at the edges thereof by the deflection of the wind by vertical-louver walls 17.

A second louver wall 21, comprising a series of upright pipes 22 mounted in the ground as at 23 between which a plurality of horizontal, parallel louvers 24 are pivotally supported, extends across the corner of the grove between the trees and louver walls 13 to deflect the air passing through and between walls 13 upwardly over the grove. The specific construction of the wind deflecting means provided by louver wall 21, being disclosed in my Patent No. 2,039,522, is not described here in detail. For the purpose of grounding electric charges in the wind passing through and adjacent the louver walls, each upright pipe 22 incloses an electricity conductive wire 25. Wires 25 extend through their respective pipes 22 and are each grounded as at 26 in any manner well known in the art.

A series of poles 27 are evenly distributed throughout the grove, the exact number or placement of which being variable according to the intensity of the storms where the orchard is located, to attract and ground static electricity and converted electric charges in the wind above the grove.

Each pole 27 consists in a plurality of pipe sections 28 as hereinafter described, and is mounted in a hole 29 in the ground at the place desired for its placement. Holes 29 are partially filled with charcoal 30. A cylinder 31 having a perforated closure plate 32 at its lower end is placed in each hole 29 on top of the charcoal 30. Supported on closure plate 32 and extending upwardly through cylinder 31 is the lowest pipe section 28a of the conductor pole having its lower end flanged at 33 to lend stability thereto. Springs 34 of any type well known in the art are brazed to pipe 28a and expand against the sides of cylinder 31 to assist in maintaining the vertical position of the pipe, but permitting its lateral movement in response to the influence of sudden winds. Springs 34 and flange 33 also serve to align the pipe with the central perforation 35 of closure plate 32. The upper pipe section extensions 28 of pole 27 are preferably of smaller diameter in upward series and are connected by means about to be described.

The upper end of each pipe section 28 to which an upper pipe section is connected is reduced in outside diameter, forming an upwardly directed shoulder 36. A V-shaped slot 37 is cut in the upper end of the lower pipe 28a to a point below shoulder 36. A brass collar 38 encircles the upper end of the pipe section seating on the shoulder. Slot 37 is filled with brass or the like to rigidly connect the pipe and collar. On the lower end of each upper pipe section 28, a reducer coupling 39 is threaded. The lower bores of couplings 39 are enlarged in diameter, and are provided with longitudinal V-shaped slots 40 which are cut in the lower ends thereof to a point above the upper end of their respective enlarged bores. A brass collar 41 lines the enlarged bore of each coupling 39. The respective collars 41 in couplings 39 are rigidly secured by the brass with which the slots 40 are filled. The inside and outside peripheries of collars 37 and 41, respectively, are threaded for their connection. An electricity-conductive rod 42 may be substituted for the uppermost pipe section as illustrated in Figs. 6 and 10.

A series of wires 43 are brazed to the lower end of cylinder 31 extending upwardly through hole 35 in closure plate 32 and pipe section 28a, having their upper ends brazed with the brass in the lower end of slots 37. Each upper pipe section 28 is provided with one or more wires 43a which have their opposite ends brazed to the brass in slot 40 of their coupling and to the brass in the slot 37 in the upper end of the respective pipe sections as designated at 44 and 45 respectively. Thus each unit of coupling and pipe section is provided with its own set of wires connected by collars 37 and 41 and the brass of slots 37 and 40. It will be seen that the sections 28 may be disassembled without disturbing these connections.

A series of holes 46 are provided in pipe sections 28, preferably spaced equidistantly along the length of the pole. One of wires 43a extends through each hole 46 and has its outer end frayed to furnish a plurality of auxiliary conductors 47. A wire 43a secured to the uppermost reducer coupling 39 is connected to rod 42. A short section of a wire 48 is connected to rod 42, by any means well known in the art, as by a pipe 49 (Fig. 10) which supports the wire laterally from the rod. The free end of the wire is frayed in the same manner and for the same purpose as are the ends of the lower wires.

A bushing 50 is rigidly secured to one of pipe sections 28 on which a metal rotor 51 is mounted. Ball bearings 52 carried by bushing 50 provide rotative support for hub 53 to which concavo-convex blades 54 of the rotor are secured by rivets or the like. The actuation of the rotor by the wind against the blades, in an obvious manner, augments, by its movement, the attraction of the pole to the static electricity which it is desired to ground.

It has been found that a quantity of water poured into each cylinder 31 increases the efficiency of poles 27 in grounding static electricity by making a better contact between wires 43 and the ground.

While I have disclosed a preferred embodiment of my invention, it will be understood that numerous changes may be made in relative position, size, proportion and shape of the parts; that any conventional means for the connection of the wires of individual pipe sections may be substituted for that shown; that the rotor elements may be omitted, or mounted on separate standards; and that the number of wires within the pipe sections may be varied as desired—all without departing from the spirit of my invention as defined in the appended claims.

What I claim and desire to secure by Letters Patent is:

1. In a device of the character described, a louver wall to horizontally deflect air currents, means aligned in the direction of air movement with said louver wall to deflect air currents vertically, and an electricity conductor to ground electricity concentrated by friction of air deflected by said means against natural air currents.

2. In a device of the character described, a lower wall to deflect horizontal air currents laterally and, by air friction, to concentrate static electric charges, and a conductor to attract and ground the concentrated electricity.

3. In a device of the character described, means to deflect air and, by air friction, to concentrate static electric charges, and a conductor comprising a charcoal bed, a sectional pipe extending upwardly from said charcoal bed, a plurality of composite wires, each wire comprising a series of strands, grounded in said charcoal bed and extending upwardly through said pipe, one of said wires extending through a hole in said pipe and frayed, each strand forming a separate conductor.

4. In a device of the character described, a vertical louver to deflect wind, means to retain the transverse axis of said louver at any adjusted angle with respect to the direction of air movement, and an electricity conductor to attract and ground electricity concentrated by the friction of air deflected by said louver.

5. In a device of the character described, means to spread air currents laterally, a louver wall adjacent to said means aligned with the direction of air movement and said means to deflect said air currents in a direction at an angle to a horizontal plane, and means to ground electricity, concentrated by friction of air deflected by said first-mentioned means and said louver wall.

6. In a device of the character described, means to deflect air currents to concentrate by air friction free electric charges, a rotor element to attract electricity concentrated by said air friction, and a conductor connected to said rotor element to ground said electricity.

JOHN DEL REA DE LAND.